United States Patent Office 3,362,939
Patented Jan. 9, 1968

3,362,939
BATCH HYDROGENATION OF PETROLEUM RESINS
Karsten Herbert Moritz and Leonard Joseph Delany, Baton Rouge, La., assignors to Esso Research and Engineering Company, a corporation of Delaware
No Drawing. Filed Sept. 25, 1964, Ser. No. 399,387
3 Claims. (Cl. 260—82)

ABSTRACT OF THE DISCLOSURE

Color degradation of hydrogenated resin is prevented by separately preheating resin feed and hydrogenation catalyst prior to contacting with hydrogen. Either the catalyst and solvent are preheated together and the resin is injected at reaction temperature or the resin and solvent are preheated and the catalyst is injected at reaction temperature.

This invention relates to improved methods for hydrogenating petroleum resins by batch process and relates more particularly to such a process in which improvements are obtained in catalyst efficiency and hydrogenation rates.

It is known to prepare low-colored resins by polymerizing steam-cracked petroleum fractions with Friedel-Crafts catalysts and hydrogenating the resulting resin in the presence of a hydrogenation catalyst by batch methods. However, it has been found difficult to obtain a low-colored resin in a commercially acceptable period of time by this method.

In accordance with the present invention it has been found that low-colored resin can be obtained by batch operation in a short period of time provided the catalyst is not allowed to contact the resin for any appreciable length of time prior to the attainment of reaction temperature. When contact of the resin and catalyst is avoided in this manner catalyst efficiency is increased and hydrogenation rates are improved.

In a preferred embodiment of the present invention, a substantially water-white hydrocarbon resin is obtained from a steam-cracked naphtha fraction boiling within about 50° F. to 450° F. having the following approximate composition:

|  | Weight percent |
|---|---|
| Benzene | 5–15 |
| Toluene | 5–10 |
| Higher aromatic hydrocarbons | 5–30 |
| Cyclic diolefins | 5–15 |
| Cyclic monoolefins | 5–10 |
| Aliphatic diolefins | 10–15 |
| Aliphatic monoolefins | 10–30 |
| Paraffins | 0–5 |

This fraction may be subjected as it is to polymerization in the presence of a Friedel-Crafts catalyst, such as $AlCl_3$, $BF_3$, $SnCl_4$, $TiCl_4$, $AlBr_3$, etc., at a temperature of about $-150°$ F. to $+200°$ F,. preferably 70 to 130° F.

However, it may be desirable to subject the steam-cracked fraction to heat-soaking to remove the cyclic dienes, although this is not required in accordance with the present invention. If it should be desirable to remove the cyclodienes, this is conveniently done by heating the fraction at a temperature of about 180° F. to 240° F. for a time sufficient to dimerize the cyclodienes which are separated by distillation.

The resin thus produced becomes the feed to the second step of the process. In this step the resin is hydrogenated under batch conditions in the presence of a catalyst to obtain a substantially water white resin.

In a standard batch hydrogenation run, the resin, catalyst and solvent are mixed in a batch reactor, heated to reaction temperature and hydrogenation is initiated by the addition of hydrogen. Heating of the solution may be effected in a hydrogen or nitrogen atmosphere. Since hydrogenation is not initiated until a minimum temperature of 300 to 350° F. is reached, the catalyst is exposed to unhydrogenated resin for some length of time before hydrogenation begins. It has now been found that this exposure of the catalyst to the unhydrogenated resin severely deactivates the catalyst and leads to much lower catalyst efficiencies and/or less color removal from the resin in a given length of time over a given quantity of catalyst. According to this invention, in batch hydrogenation, the catalyst is preheated to reaction temperature separately from the resin. Either the catalyst and solvent are preheated and the resin is injected into the reactor when reaction temperature is reached, or alternately solvent and resin are preheated to reaction temperature and the catalyst is injected when reaction temperature is reached. Only in this way is contact of the catalyst with the unhydrogenated resin avoided before hydrogenation is initiated.

Suitable diluents include the aromatic solvents disclosed in U.S. Patent No. 2,824,860 to Aldridge, namely benzene, toluene, xylenes and mixtures thereof as well as the aliphatic solvents such as hexane; isohexane; 3-methylpentane; 2,2-dimethylpentane; 2,3-dimethyl-pentane; 2,4-dimethyl-pentane; 3,3-dimethyl-pentane; 3-ethyl-pentane; n-heptane and the various octanes, etc.

Suitable hydrogenation catalysts include metals of Groups VI and VIII of the periodic table, e.g., nickel, palladium, platinum, nickel sulfides, copper chromite, cobalt molybdate, or various other catalysts, any of which may be supported on light porous or granular particles of large surface area such as alumina, pumice, clay, charcoal, etc.

The hydrogenation in a batch process is effected under a hydrogen pressure of about 100 to 5000 p.s.i.g., preferably about 500 to 3000 p.s.i.g., at temperatures of 100 to 750° F., preferably about 300 to 500° F. with a resin to catalyst ratio of 1/1 to 300/1, preferably 10/1 to 50/1.

The concentration of the resin solution submitted to hydrogenation has an important effect on the rate and extent of color removal at equivalent amounts of catalyst. At too high a concentration, viscosity prevents good catalyst contacting. Too low a concentration is uneconomical. It has been found that a concentration of 50 wt. percent resin in solvent is the maximum concentration that can be tolerated without large sacrifice in rate. A range of 20 to 50 wt. percent resin in solvent is suitable with about 20 wt. percent preferred.

The hydrogenated resin solution is advantageously subjected to a washing treatment prior to stripping. This washing should be done at a pH greater than 7. For example, the resin may be washed with dilute solutions of alkalis, such as caustic, caustic potash, calcium hydroxide, sodium carbonate or the like. This treatment results in a stabilization of color and softening point during stripping. The washed resin may be either stored and shipped as such or it may be subjected to stripping under low pressure, e.g., steam stripping or vacuum stripping to remove the volatile solvents as well as any low boiling oil present. It is important, however, that this stripping process be effected under conditions sufficiently stringent only to form a substantially water white color, but without any substantial reduction in softening point of the resin or any other substantial degradation thereof. This may be accomplished using conventional steam stripping techniques under mild stripping conditions. The resin may be stripped at any temperature but for the purposes of this invention the temperature should not exceed 500° F. A temperature range of about 300 to 500° F. is therefore suitable using a stripping time of from about 20 to about 60 minutes with the longer time periods being employed with the lower temperatures and vice versa.

The resulting hydrogenated resin has a Gardner color, in 50% solution in toluene, of less than 2 and generally averages about 1–1.5. This is equivalent to a color of less than 500 and generally less than 300 on the Hazen scale. It has a softening point of 200 to 250° F., a bromine number below about 20 (generally below 10) and is very light colored. It is soluble in petroleum hydrocarbons, such as hexane and mixed paraffinic hydrocarbons of the naphtha boiling range and also in aromatic hydrocarbons, such as benzene, toluene, xylene, etc. In general, the molecular weight of the resin is about 500 to 3000, generally about 1000 to 2000.

The advantages and details of the invention will be better understood from the following specific examples.

*Example 1*

A gas oil petroleum fraction derived from a paraffinic type crude was subjected to steam cracking at a temperature of about 1300–1450° F. and pressure of 5 to 20 p.s.i.g. in the presence of about 70 to 80 mol percent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_{6-8}$ diolefins | 8–10 |
| $C_{6-8}$ olefins | 14–15 |
| $C_{9-12}$ diolefins | 3 |
| $C_{9-12}$ olefins | 4 |
| Benzene | 15 |
| Toluene | 10 |
| Xylenes | 2–3 |
| $C_{9-12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_{6-8}$ diolefins | 13 |
| $C_{6-8}$ olefins | 20 |

The resulting product was subjected to Friedel-Crafts continuous polymerization at a temperature of 90–120° F. for a residence time of one volume of feed per volume of reactor per hour (1 v./v./hr.) using 1% by weight of aluminum chloride (based on total feed) as catalyst.

*Example 2*

Three samples of the above polymerization product were stripped until dry to remove unreacted components and were dissolved under nitrogen at room temperature in heptane which had been preheated to 400° F. and mixed with a 5% palladium on alumina catalyst also preheated to the same temperature. Hydrogen was introduced under 1000 p.s.i.g. pressure after varying lengths of time after introducing the resin. The resulting hydrogenated resins were tested for color removal with the following results.

| | Run No. | | |
|---|---|---|---|
| | 1 | 2 | 3 |
| Holding time before introduction of $H_2$ (min.) | 60 | 10 | 0 |
| Percent color removal after 30 minutes | 24 | 38 | 75 |

The above data clearly show that very short exposures of the catalyst to the preheated resin without the presence of hydrogen severely deactivate the catalyst and thereby decrease catalyst efficiency.

*Example 3*

That the results of Example 1 are not due to resin deterioration due to heat soaking of the resin but actually reflect catalyst deactivation is shown by the following:

The resin and catalyst were heat soaked for one hour in a nitrogen atmosphere as was done in Run No. 1 in Example 2, but no hydrogen was introduced. The catalyst was recovered, washed and used to hydrogenate a fresh charge of resin under the same conditions as in Example 1. The following data were obtained:

| | Run No. | |
|---|---|---|
| | 4 | 5 |
| Catalyst | (¹) | Fresh |
| Percent color removal after 30 min | 24 | 80 |

¹ Soaked in resin.

The above data show that a catalyst which has done no prior hydrogenation, but has been exposed to resin before hydrogenation is initiated, is severely deactivated.

*Example 4*

The following experiments were designed to show that the usual procedure of starting up a batch reactor by heating the total reaction mixture to reaction temperature is inferior to separately preheating catalyst and solvent and injecting the resin into the hot solvent so as to avoid contact of catalyst and resin prior to hydrogenation.

In the first run the total reaction mixture of resin, catalyst and solvent (as used in Example 2) was heated to a reaction temperature of 400° F. in a hydrogen atmosphere. Actual hydrogenation began some time before the temperature of 400° F. was attained. In the second run catalyst and solvent were preheated to a reaction temperature in a $H_2$ atmosphere and the resin concentrate was injected when reaction temperature was reached. The following data were obtained:

| Time after Reaching 400° F., min. | Percent Color Removal After Reaching 400° F. | |
|---|---|---|
| | Run 1 | Run 2 |
| 30 | 43 | 75 |
| 60 | 53 | 83 |
| 120 | 64 | 88 |

The above data clearly show that the separate injection method is far superior to the usual method of batch reactor startup.

The advantages of the present invention having thus been fully set forth and specific examples of the same given, what is claimed as new and useful and desired to be secured by Letters Patent is:

1. An improved process for preparing a substantially water-white petroleum resin from a steam-cracked naphtha fraction boiling between about 50 and 450° F. having the following composition:

| | Parts by weight |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | which comprises subjecting said fraction to polymerization in the presence of a Friedel-Crafts catalyst at a temperature between −150 and +200° F. to polymerize the resin-forming constituents, and form a solution of resin in non-resin-forming constituents, separating resin from said non-resin-forming constituents, dissolving sufficient resin in 100 parts by weight of a substantially hydrocarbon solvent to make a 20 to 50% solution of resin in solvent, separately preheating said resin and hydrogenation catalyst to reaction temperature and contacting same in the presence of hydrogen under pressure and at a temperature between 100 and 750° F. to obtain a hydrogenated resin solution and separating a hydrogenated resin having a softening point of at least 200° F.

2. An improved process for preparing a substantially water-white petroleum resin from a steam-cracked naphtha fraction boiling between about 50 and 450° F. having the following composition:

| | Parts by weight |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | which comprises subjecting said fraction to polymerization in the presence of a Friedel-Crafts catalyst at a temperature between −150 and +200° F. to polymerize the resin-forming constituents, and form a solution of resin in non-resin-forming constituents, separating resin from said non-resin-forming constituents, dissolving sufficient resin in 100 parts by weight of a substantially hydrocarbon solvent to make a 20 to 50% solution of resin in solvent, preheating said resin solution to temperature between 100 and 750° F. without subsequent cooling, and contacting said preheated solution with hydrogenation catalyst and hydrogen under pressure and at the same temperature to obtain a hydrogenated resin solution and separating a hydrogenated resin having a softening point of at least 200° F.

3. An improved process for preparing a substantially water-white petroleum resin from a steam-cracked naphtha fraction boiling between about 50 and 450° F. having the following composition:

| | Parts by weight |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | which comprises subjecting said fraction to polymerization in the presence of a Friedel-Crafts catalyst at a temperature between −150 and +200° F. to polymerize the resin-forming constituents, and form a solution of resin in non-resin-forming constituents, separating resin from said non-resin-forming constituents, preheating a mixture of hydrocarbon solvent and hydrogenation catalyst to reaction temperature, dissolving sufficient resin in 100 parts by weight of said hydrocarbon solvent containing catalyst to make a 20 to 50% solution of resin in solvent, and contacting said solution with resin and hydrogen under pressure and at a temperature between 100 and 750° F. to obtain a hydrogenated resin solution and separating a hydrogenated resin having a softening point of at least 200° F.

References Cited

UNITED STATES PATENTS 2,911,395  11/1959  Small _____ 260—82

JOSEPH L. SCHOFER, *Primary Examiner.*

R. A. GAITHER, *Assistant Examiner.*